Dec. 7, 1954  T. McCULLOCH, JR., ET AL  2,696,175
RERAILER FOR MONORAIL CONVEYER SYSTEMS
Filed Oct. 5, 1951   3 Sheets-Sheet 2
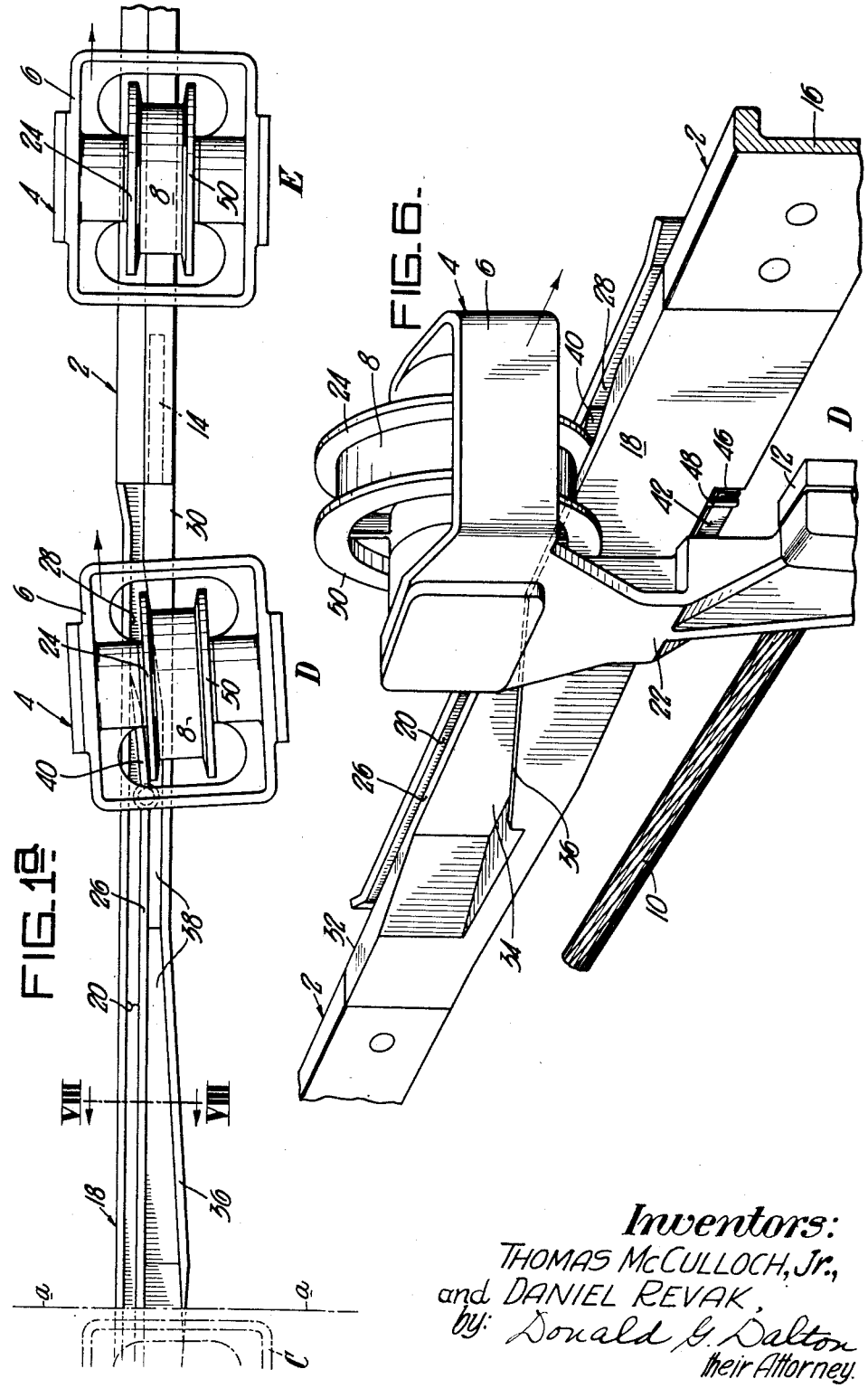
Inventors:
THOMAS McCULLOCH, Jr.,
and DANIEL REVAK,
by: Donald G. Dalton
their Attorney.

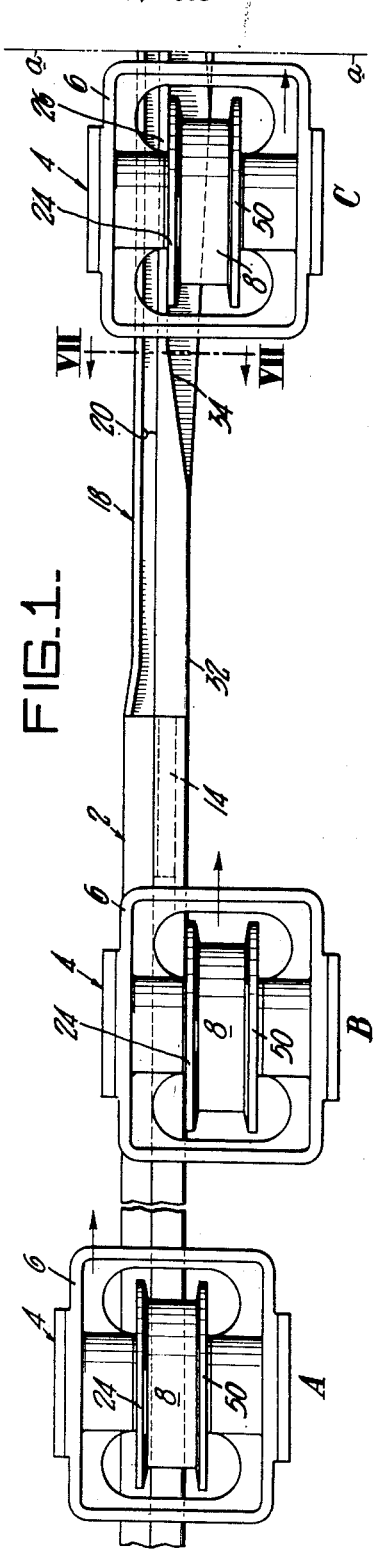

Dec. 7, 1954 T. McCULLOCH, JR., ET AL 2,696,175
RERAILER FOR MONORAIL CONVEYER SYSTEMS
Filed Oct. 5, 1951 3 Sheets-Sheet 3
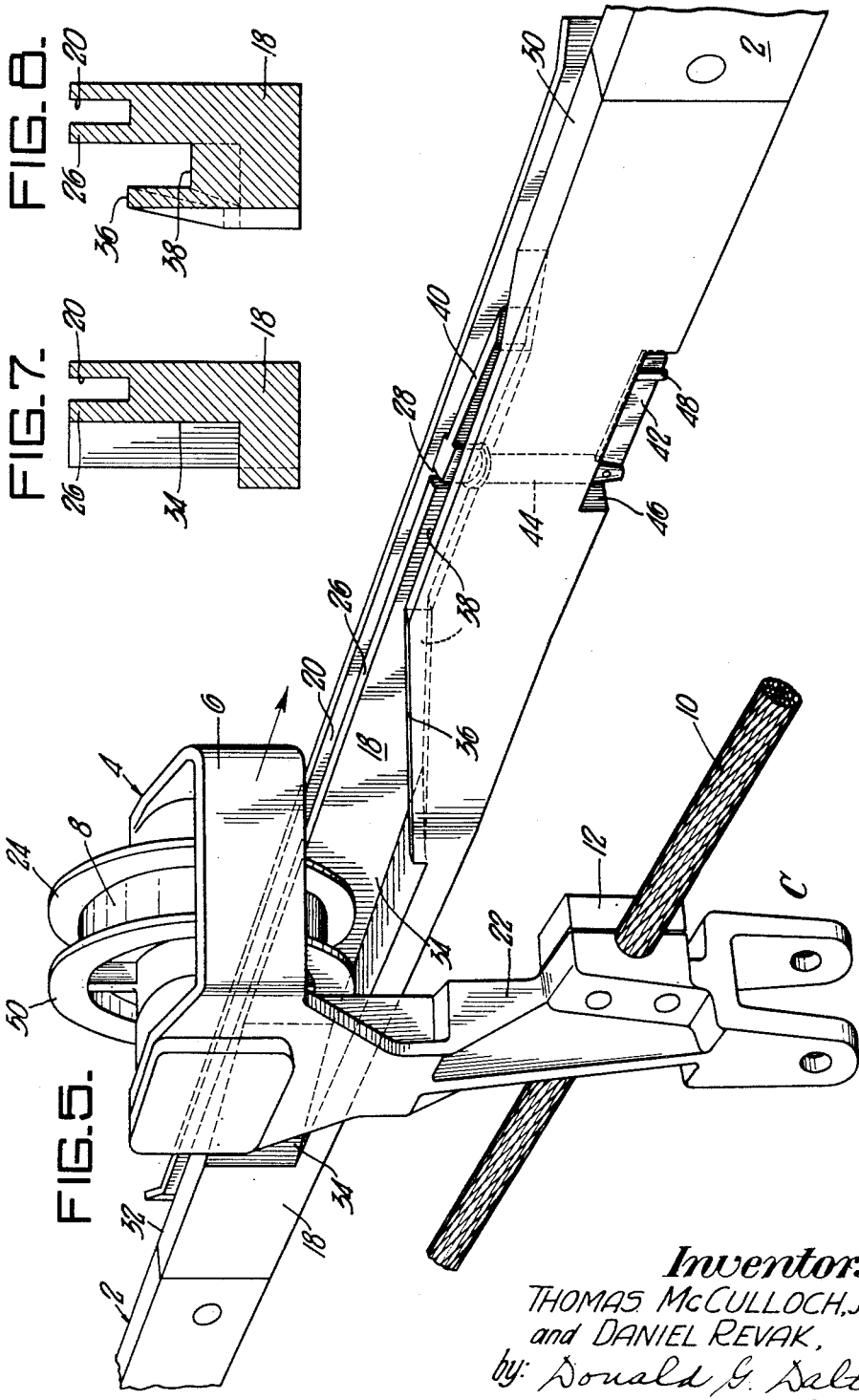
Inventors:
THOMAS McCULLOCH, JR.,
and DANIEL REVAK,
by: Donald G. Dalton
their Attorney.

ical manner, the groove 20 and the lateral recess

United States Patent Office 2,696,175
Patented Dec. 7, 1954

2,696,175

RERAILER FOR MONORAIL CONVEYER SYSTEMS

Thomas McCulloch, Jr., Donora, Pa., and Daniel Revak, Parma, Ohio, assignors to United States Steel Corporation, a corporation of New Jersey Application October 5, 1951, Serial No. 249,888

2 Claims. (Cl. 104—264)

The present invention relates to a rerail mechanism for a monorail conveyor system.

As is well known, the monorail conveyor system is extensively used throughout industry for transporting raw materials and manufactured articles from one processing stage to another and from the end of a processing line to a storage or shipping point.

In the manufacture of steel rods, hot rolled rods are rolled on a rod mill and coiled into annular bundles by suitable reeling means which receive the rod from the finishing roll stand of the rod mill. The annular bundles are ejected from the reeling means onto a flat belt conveyor from which they are transferred to an overhead hook conveyor. Generally the hook conveyor is of the monorail type which consists of a number of suspended hooks upon which the bundles are hung so that their axes lie in substantially horizontal position. These hook conveyors travel at a relatively slow speed and function to convey the rod bundles usually to a storage location in the mill or to a loading dock where the bundles are transferred to gondola cars or the like for shipment to another mill where further processing of the rods is carried on. Such hook conveyor systems are usually quite lengthy and do not travel in a straight line nor do they travel at a uniform elevation along their entire length.

Due to the fact that there are many turns and differences in elevation in any given conveyor system of this type, derailment of the trolleys, from which the hooks are suspended, often occurs. Derailment of the trolleys would cause a wreck if the trolleys were not replaced on the monorail prior to entry into the so-called bull wheels or large power driven sheaves which impart movement to the hooks by means of a cable which moves along the length of the monorail spaced thereunder. The carrying means which are attached to the trolleys are clamped to this cable so that the trolley wheels may be moved along the monorail by means of the cable. A wreck on the conveyor results in costly down time of the mill while repairs are being made. While the conveyor system is down the entire rod mill operation is halted.

It is accordingly an object of our invention to provide a rerailing mechanism which may be installed in the line of a monorail hook conveyor system for automatically rerailing any derailed trolleys thereof.

This and other objects will become more apparent after referring to the following specification and attached drawings, in which:

Figure 1 is a plan view showing a trolley traveling in normal position and derailed position approaching the rerailer of our invention;

Figure 1a is a continuation of Figure 1 with the division taken on the line a—a of Figure 1 and Figure 1a;

Figure 2 is a side elevation of the trolley at position A of Figure 1;

Figure 3 is a view similar to Figure 2 of the trolley at position B of Figure 1;

Figure 4 is an end elevation of Figure 3;

Figure 5 is an enlarged perspective view of the trolley at position C of Figure 1;

Figure 6 is a view similar to Figure 5 of the trolley at position D of Figure 1a;

Figure 7 is a sectional view taken on the line VII—VII of Figure 1; and

Figure 8 is a view similar to Figure 7 taken on the line VIII—VIII of Figure 1a.

Referring more particularly to the drawings, reference numeral 2 indicates the overhead rail of a monorail hook conveyor system having a plurality of spaced trolleys 4 mounted for movement thereon. Each of the trolleys 4 consists of a bracket 6 which supports a double-flanged trolley wheel 8 in the top portion thereof. Wheels 8 normally ride along the top portion of the rail 2. A flexible steel cable 10, to which the brackets 6 are suitably connected by means of clamps 12, extends beneath and parallel to the rail 2. The cable 10, with brackets 6 clamped thereto, is propelled longitudinally by means of power-driven bull wheels or sheaves, not shown.

The apparatus described thus far is conventional and is similar to that disclosed in the patent to O'Malley No. 2,227,160, dated April 1, 1941. The rerailer of our invention, which will now be described in detail, is adapted to be installed at chosen locations along the length of rail 2 and especially just ahead of a bull wheel or power-driven sheave. The rerailer is so designed as to make it possible to install it within any given section of the monorail to become a permanent part thereof.

As shown in Figures 1 and 1a, the rerailer is provided with integral ear portions 14 at either end which are adapted to be suitably bolted against the inside of the web 16 of the rail 2. The body of the rerailer includes a main body portion 18 having a groove 20 in the upper surface thereof on the side opposite the path of the depending carrier arms 22 of the brackets 6. Groove 20 is of substantially uniform contour along its length and extends the full length of the rerailer body to serve as a channel for receiving the outer flange 24 of the wheels 8. The portion of the main body adjacent the groove 20 serves as a wheel supporting rail or section 26 and extends longitudinally in alignment with the rail 2. Rail 26 has a cutaway section 28 adjacent its one end 30. End 30 is of the same cross sectional area as the rail 2. The connecting portion 32 at its opposite end is of the same cross sectional area as the rail 2 for a short distance and then is gradually reduced in cross sectional area to form a lateral recess 34, the purpose of which will become apparent as this description proceeds. An inclined ramp 36, which is integral with the floor of the recess 34, extends upwardly to the level of the wheel supporting section 26. The inclined ramp 36 is spaced from the wheel supporting section to form a channel 38 for receiving the outer flange 24 of the wheels 8. Although not essential to the functioning of our rerailer a spring loaded guide lever 40 may be pivotally mounted in the cutaway section 28 in order to guide the flange 24 of the wheels into the proper channel. The guide lever 40 is urged constantly toward the ramp 36 by means of a strip of spring steel 42 which is attached and extends normal to the bottom of the shaft 44 of the lever 40. The spring strip 40 lies in a recess 46 in the bottom of the rerailer and works against a peg 48, as shown in Figures 5 and 6.

In operation, a derailed trolley will hang tightly against the inner side of the rail 2, as shown in position B of Figure 1. The derailed trolley will assume this position and will not fall completely away from the rail 2 because the trolleys are spaced very close together and if the wheels of the trolleys in front of and in back of the derailed wheel remain in normal positions on track 2, they will afford sufficient support through cable 10 to prevent the derailed trolley from dropping free of the rail. When the derailed wheel approaches the rerailer the tension of cable 10 will urge the wheel against the side of the rail 2 and then force it into the lateral recess 34 when the wheel arrives opposite thereof, as shown at C in Figure 1. When the wheel 4 enters the lateral recess 34 the flange 24 will be received in the channel 38 and this will cause the wheel to be guided upwardly and forwardly past the spring loaded guide lever 40, and the flange 24 to fall within the groove 20, as shown at D in Figure 1a, thus, repositioning the wheel on the rail 2 in its rerailed or normal position as indicated at E in Figure 1a. Although the rerailer will function without the lever 40, its presence insures that the inner flanges 50 of the wheels will remain outside of channel 38.

When the wheel 8 travels along rail 2, normally, groove 20 serves as a guide means for the wheel and prevents the inner flange 50 thereof from entering the lateral recess section 34 when the wheel passes the same. In normal movement when traveling over the rerailing mechanism the outer flange 24 travels in the groove 20 while the inner flange 50 travels outside of the mechanism, as shown in Figure 1. Groove 20 also prevents the inner flange 50 of the trolley wheels from entering the lateral recess 34 when the trolleys travel over the rerailing device in normal manner and are not derailed. It is to be noted that the distance from the groove 20 to the outside of the inclined ramp 36 is less than the distance between the flanges of the wheels so as to allow the inner flanges 50 of wheels that are not derailed to remain on the outside of the device.

While one embodiment of our invention has been shown and described it will be apparent that other adaptations and modifications may be made without departing from the scope of the following claims.

We claim:

1. In a monorail conveyor system including an overhead conveyor rail, a plurality of trolleys mounted for movement along said rail, each of said trolleys having a frame and a double flanged wheel adapted to ride on said rail rotatably mounted in said frame, carrier means suspended from one side of each of said trolleys, and propelling means interconnecting said trolleys and adapted to move the same along said rail the combination therewith of a rerailer inserted in said rail as an integral part thereof, said rerailer comprising a main body portion having a groove in the upper surface thereof on the side opposite said carrier means, said groove being adapted to receive a flange of said wheels and extending substantially the length of the body portion, a wheel supporting section on said body member arranged in substantial alignment with said rail, an inclined ramp spaced from the wheel supporting section on the side thereof opposite said groove and extending upwardly from the lower part of said body portion away from the direction of wheel approach to a point adjacent the top of the rail, said ramp being disposed in the path of a derailed trolley whose frame is riding on the rail, the distance between the outer edge of the ramp and the edge of said wheel supporting section adjacent said groove being less than the distance between the flanges of the wheels, said wheel supporting section having a cutaway portion adjacent the top of the ramp through which the derailed wheel rides to rerailed position, and a vertical beveled guide extending from said ramp to the end of said rail adjacent said cutaway portion.

2. In a monorail conveyor system a combination therewith as defined in claim 1 characterized by a spring loaded guide lever pivotally mounted in said cutaway portion abutting said wheel supporting section, said lever being pivoted at the end thereof adjacent the end of said wheel supporting portion and constituting a pivotal extension of said wheel supporting portion, and spring means for urging said lever toward said ramp.

References Cited in the file of this patent

UNITED STATES PATENTS

| Number | Name | Date |
| --- | --- | --- |
| 148,834 | Kissell | Mar. 24, 1874 |
| 979,494 | Howard | Dec. 27, 1910 |
| 2,017,404 | Lorig | Oct. 15, 1935 |